(No Model.) 5 Sheets—Sheet 1.
G. W. PICKETT & A. W. PICKERING
WIRE ROPE TRAMWAY.
No. 414,445. Patented Nov. 5, 1889.
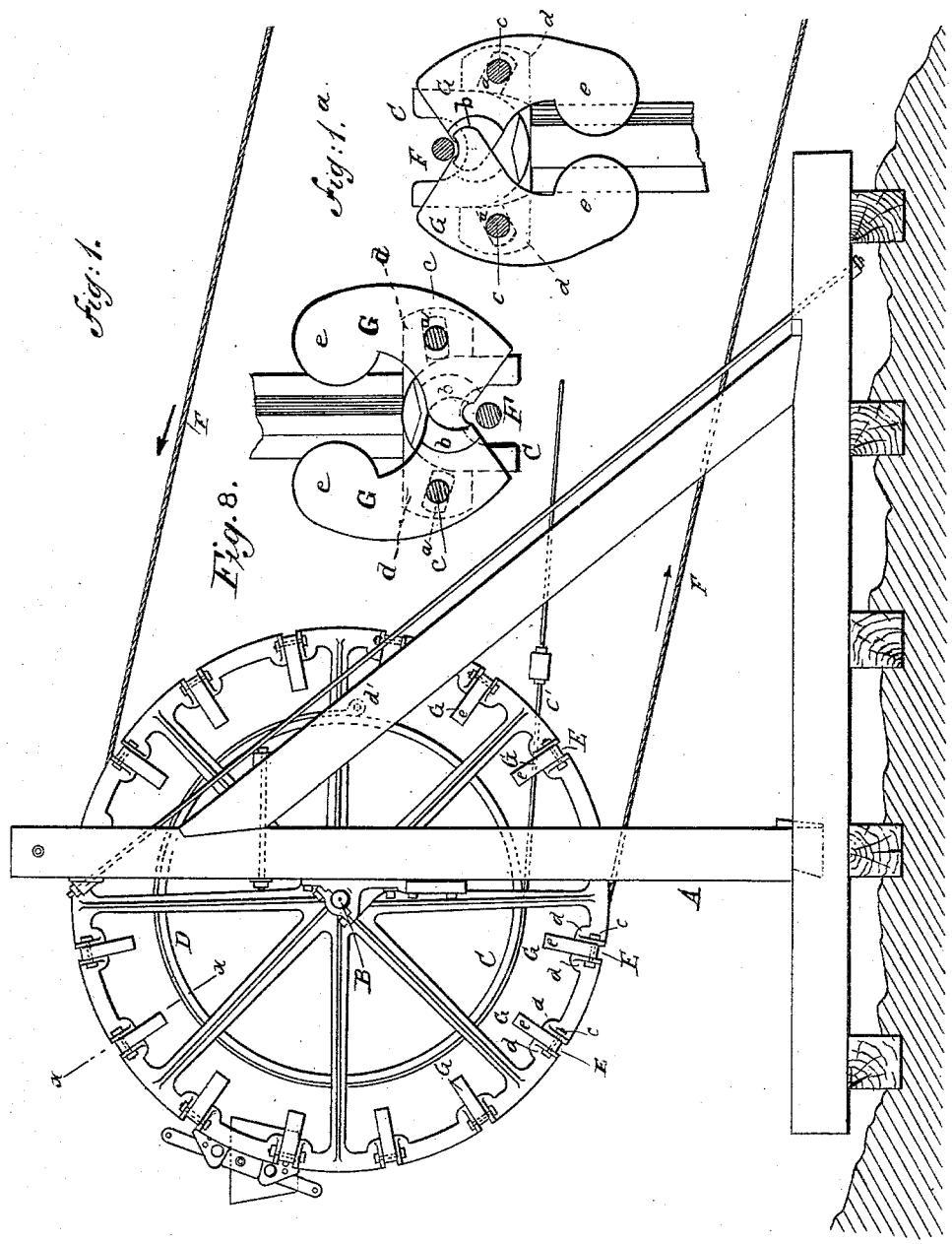
WITNESSES:
INVENTOR:
G. W. Pickett
A. W. Pickering
BY Munn & Co
ATTORNEYS.

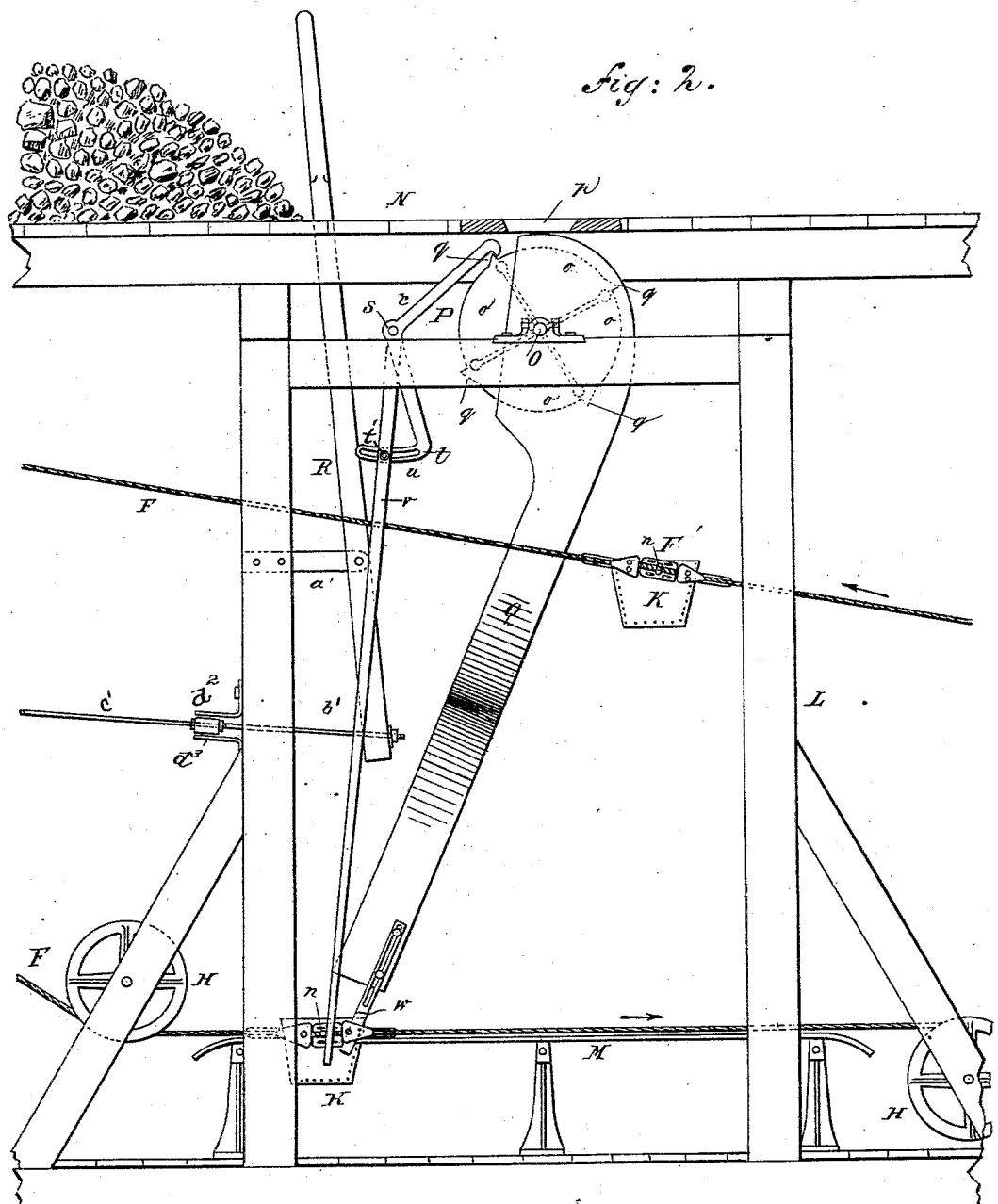

(No Model.) 5 Sheets—Sheet 3.
G. W. PICKETT & A. W. PICKERING.
WIRE ROPE TRAMWAY.
No. 414,445. Patented Nov. 5, 1889.
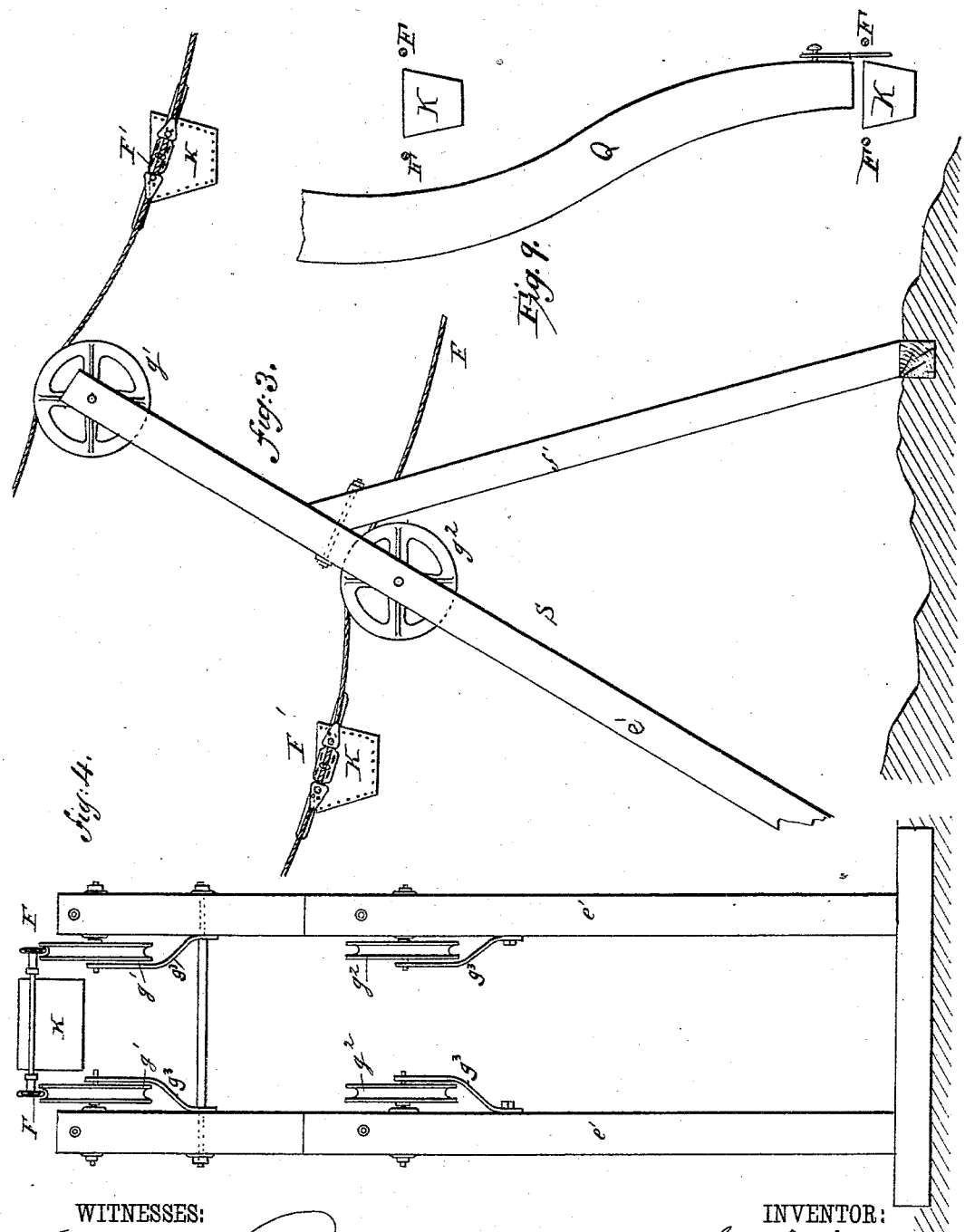

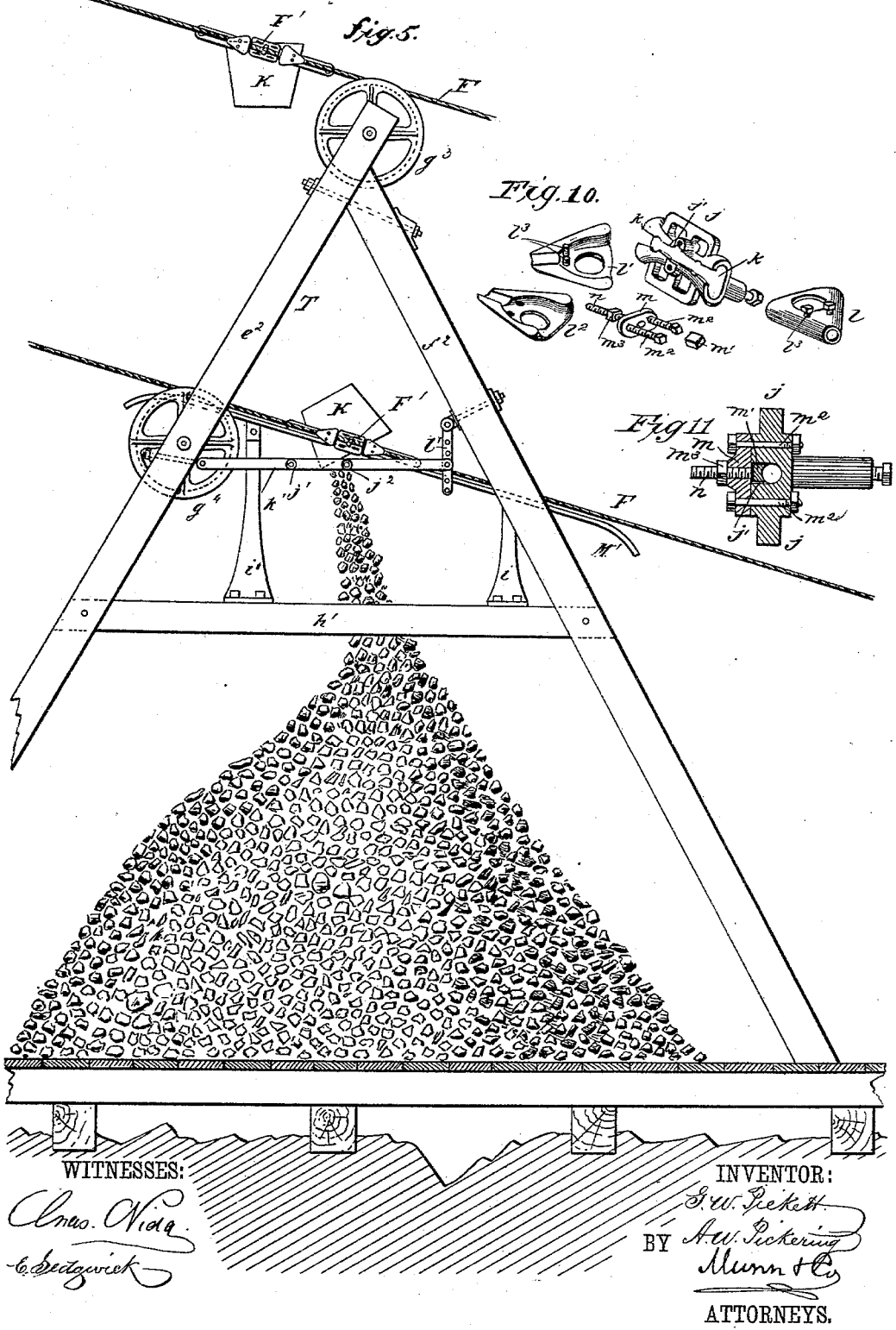

(No Model.) 5 Sheets—Sheet 5.

G. W. PICKETT & A. W. PICKERING.
WIRE ROPE TRAMWAY.

No. 414,445. Patented Nov. 5, 1889.

WITNESSES:

INVENTOR:
G. W. Pickett
A. W. Pickering
BY
ATTORNEYS.

UNITED STATES PATENT OFFICE.

GEORGE W. PICKETT AND ABEL W. PICKERING, OF PORTLAND, COLORADO.

WIRE-ROPE TRAMWAY.

SPECIFICATION forming part of Letters Patent No. 414,445, dated November 5, 1889.

Application filed December 24, 1887. Serial No. 258,936. (No model.)

*To all whom it may concern:*

Be it known that we, GEORGE W. PICKETT and ABEL W. PICKERING, both of Portland, in the county of Ouray and State of Colorado, have invented a new and Improved Wire-Rope Tramway, of which the following is a specification, reference being had to the annexed drawings, forming a part thereof, in which—

Figure 6:
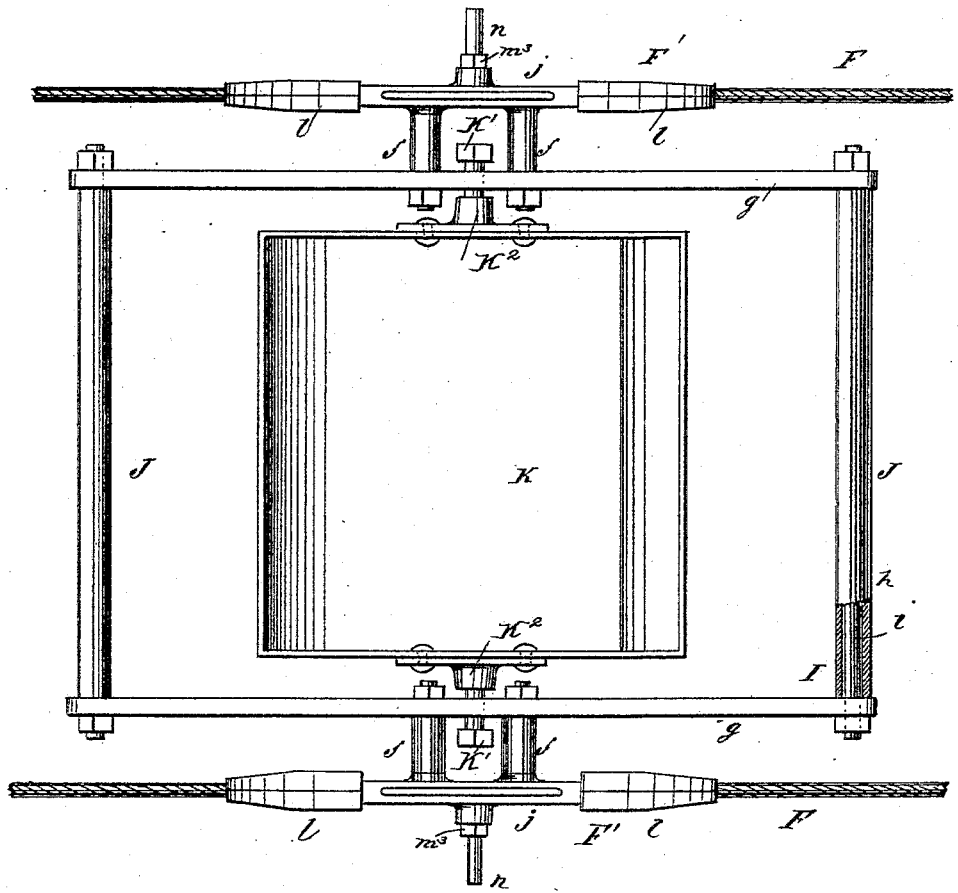
Figure 7:
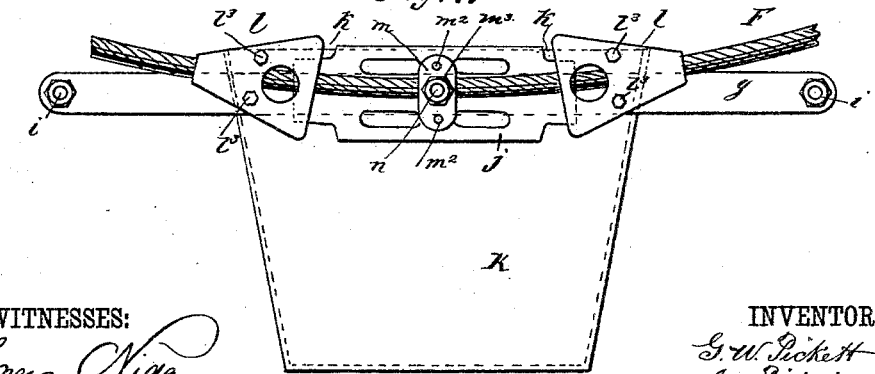

Figure 1 is a side elevation of one of the sheaves at the terminus of the tramway. Fig. 1ª is a transverse section of the rim of the wheel, taken on line $xx$ in Fig. 1. Fig. 2 is a side elevation of the loading mechanism. Fig. 3 is a side elevation of one of the cable-supports, and Fig. 4 is an end elevation of the same. Fig. 5 is a side elevation of the dumping mechanism. Fig. 6 is a plan view of one of the buckets, showing the bucket-clips; and Fig. 7 is a side elevation of the same. Fig. 8 is a side elevation of one of the grippers in an inverted position. Fig. 9 is a front elevation of the offset loading-chute. Fig. 10 is a view of one of the rope-clamps with its parts separated. Fig. 11 is a transverse section through the bar $j$, clamp $m$, bolt $m^3$, follower $m'$, and the cable, showing how the bolt presses the follower against the cable and secures the bar firmly to the cable.

Similar letters of reference indicate corresponding parts in all the views.

The object of our invention is to construct a simple and efficient wire-rope tramway for conveying coal, ores, or water from mines, and for other uses for which a wire-rope tramway is adapted, the tramway being capable of operating either by means of the weight of the material conveyed or by the application of external power.

Our invention consists in an arrangement of wire cables, buckets, and loading and dumping devices, all as hereinafter more fully described.

In the frame A of the transmitting end of the tramway is journaled a shaft B, carrying two grooved wheels C, arranged near opposite ends of the shaft, each provided with a brake-rim D for controlling the motion of the wheel. In the periphery of each wheel C is arranged a series of grips E for engaging the wire rope F. Each grip E is formed of weighted levers G, provided with holes for securing the pivotal bolts C. The ends of the levers G which project into the groove of the wheel C are provided with curved lips $b$, which project into the path of the rope F, and are engaged by the rope during a part of the revolution of the wheel C. In ears $d$, projecting from the sides of the wheel C on opposite sides of the groove in the periphery of the wheel, are formed slots $a$, for receiving bolts $c$, upon which the said levers G swing. The bolts $c$ are made adjustable in the slots $a$ to compensate for any wear of the outer ends of the levers G. When the grips E approach the upper side of the wheel, the weighted ends drop down, opening the inside of the grip to receive the rope. As the wheel revolves the tension of the rope drawing upon the periphery of the wheel causes the grips to clamp upon the rope. As they approach the lower side the rope releases itself from the wheel and the grips. The grips are in this manner made to operate automatically. The ropes F, which pass around the wheels C, are guided in the loading-frame by sheaves H.

To the cables F are attached clips F', and the clips F' are connected with the bucket-carrying frames I by the studs $f$. The frames I consist of the side bars $g$ and the cross-pieces J, formed of the pipe $h$, and the rod $i$, inclosed by the pipe and extending through the side bars $g$; or shoulder-bolts may be used. The side bars $g$ at their centers are apertured for the passage of the trunnions K', which enter sockets K² on the sides of the bucket K. Each clip F' consists of end clamps $l$ and a bar $j$, having on its rear face the studs $f$, bolted to the side bars $g$, (see Fig. 6,) and the front face of said bar $j$ is grooved longitudinally to receive the cable F. At about the center of the groove a socket $j'$ is formed, in which a follower $m'$ is placed to bear on the cable. The bar $g$ is apertured above and below the socket $j'$ for the passage of the bolts $m^2$ of the clamp $m$. (See Figs. 7 and 10.) Through the center of the clamp $m$ is passed a bolt $m^3$, the inner end of which bears on the follower to cause it to bind the cable firmly in the groove in bar $j$. The bolt is prolonged beyond its squared portion to form the stud $n$ for a purpose to be hereinafter described. The ends of the bar $j$ are formed with tenons $k$, and each clamp $l$ is formed with a socket to receive said tenons and permit a vertically-rocking movement. The clamps $l$ are formed in two sections $l'$ $l^2$, grooved and recessed on their adjacent faces to form said tenon-sockets and grooves for the cable and secured together by the bolts $l^3$. By the employment of a clip of this description the cable is allowed to pass around curves and over sheaves without being bent at a sharp angle. It will be seen that the clamps $l$ turn on separate centers—that is, they turn independently on the tenons upon the ends of the bar $j$—thus preventing any strain on the rope at the point of connection between it and the bucket-carrying frames I when the clips pass over or around curves. The cables F carry as many buckets K as can be conveniently loaded and dumped.

The loading-frame L, which adjoins the frame A, is provided with a pair of guides M, upon which the studs $f$ rest and by which the frame I and the buckets K are supported in their passage through the frame L and during the loading operation. The top of the frame L is provided with a platform N, for containing the material to be conveyed by the tramway, and upon a shaft O, journaled in the frame L below the platform, is secured a chamber-wheel P, for receiving ore delivered through the opening $p$ in the platform. The wheel P is formed of circular end pieces provided with journals and radial partitions dividing the said wheel, forming chambers $o$. The wheel P is placed at one side of the center of the loading-opening $p$, so as to permit of holding the load contained by one of the chambers of the wheel at one side of the center of motion. One of the circular end pieces of the wheel P is provided with a series of lugs $q$, which are engaged by a catch $r$, turning on the pivot $s$, and provided with an arm $t$, having a curved slotted end $u$. Upon the pivot $s$ of the catch $r$ is placed a lever $v$, also turning on the pivot $s$, and extending downward into the path of the stud $n$, and is connected with the curved slotted end of the arm $t$ by a bolt $t'$, passing through the lever $v$ and slotted arm $t$. This construction permits of the adjustment of the lever $v$ relative to the catch $i$.

A spout Q is suspended from the shaft O of the wheel P. The upper end of the spout partly incloses the chambered wheel P, and the lower end of the spout is bent laterally, so as to be capable of discharging into the bucket K as it passes through the frame L, the spout Q being provided with a slotted arm $w$, secured to the side of the spout by bolts passing through the slot of the arm into the spout. The lower end of the arm $w$ projects beyond the lower end of the spout Q and between the cable F and bucket K, and is engaged by one of the studs $f$ as the bucket moves forward, thus causing the spout to follow the bucket until the arm $w$ slips off of the stud $f$.

In arms $a'$, secured to one of the timbers of the frame L, is pivoted a lever R, the longer arm of which extends upward above the platform N, while the shorter arm extends downward and is connected with the rod $b'$, which is attached to a bar $d^2$, guided in brackets $d^3$ on the frame L.

To the bar $d^2$ (see Fig. 2) are attached the forward ends of the brake-bands $c'$, which pass partly around the brake-rims D, and are secured at their rear ends to the braces $d'$ on the frame A in front of the grooved wheels C, as shown in dotted lines in Fig. 1.

Wheels C are placed at opposite ends of the tramway, and at intervals in the length of the tramway are arranged frames S, formed of the inclined timbers $e'$ and the braces $f'$. Sheaves $g'$ $g'$ and $g^2$ $g^2$ are journaled on studs projecting from the inner faces of the timbers $e'$, the said studs being supported at their inner ends by braces $g^3$. The cables are supported by the sheaves $g'$ $g^2$, and a clear space is left between the sheaves for the passage of the buckets K.

Dumping-stations, Fig. 5, may be arranged at any points along the length of the tramway.

In the frame T, formed of the timbers $e^2$ $f^2$ and the cross-timbers $h'$, are journaled the sheaves $g^3$ $g^4$, for supporting the ropes F.

Bars M', supported by standards $i'$, engage the studs $f$ of the bucket-carrying frame and steady the said frame during the dumping operations. Below the bars M' are supported two rollers $j'$ $j^2$ by bars $k'$, pivoted at one end to the timbers $e^2$, and adjustably supported at the opposite end by an apertured link $l'$, suspended from the braces $f^2$. The bucket K, as it passes through the frame T, is struck near the bottom thereof by the roller $j'$, which tips it so that the top of the bucket is engaged by the roller $j^2$, and thus completely inverted, so that its contents are discharged. After the bucket passes the roller $j^2$ it regains its normal position by its own gravity.

The operation of our improved tramway is as follows: The material to be carried is delivered to the chambered wheel P through the opening $p$ in the platform N, and when a bucket K enters the frame L the stud $n$ strikes the lever $v$ and withdraws the catch $r$ from the lug $q$. The wheel, being released, turns by its own gravity, discharging the contents of one of its compartments into the spout Q, which delivers it to the bucket K. The engagement of the arm $w$ with one of the studs $f$ causes the spout Q to be carried along with the bucket, so that sufficient time is given for the complete discharge of the load contained in one of the compartments $o$ of the wheel P. When the lever $v$ escapes from the stud $n$, the catch $r$ engages another lug of the wheel P and holds the wheel while one of its compartments is being filled, as before. The arm $w$ escapes from the studs $f$ and the spout Q returns by its own gravity to its original position. The filled bucket is carried forward by the cable to the distant point, where it is dumped by the rollers $j'$ $j^2$, as before described.

Our improved tramway may be operated at any angle between the horizontal and perpendicular, and it may be operated by the gravity of the load carried by the buckets. The rapidity of the movement of the tramway in that case will be controlled by the brake-lever R. When it is operated by external power, its movement will be regulated by suitable controlling mechanism connected with the power.

Having thus fully described our invention, we claim as new and desire to secure by Letters Patent—

1. In a rope tramway, the combination, with the bucket K and parallel ropes F, of the flexible clip F', formed of the bar $j$, having the clamp $m$, and the clamps $l$, adapted to engage the rope and embrace the ends of the said bar $j$, substantially as specified.

2. In a rope tramway, the combination, with the bucket K and cables F, of the frame I, pivotally connected with the bucket, the bars $j$, provided with studs $f\ f$ and $n$ and the clamps $m$, and the clamps $l$, clamped to the wire-ropes F and adapted to receive the ends of the bar $j$, substantially as specified.

3. The combination, with the central bar $j$, having a clamp and provided at its ends with tenons, of the clamps $l\ l$, having recesses receiving said tenons, the bar $j$ and clamps $l$ being grooved longitudinally to receive a rope or cable, substantially as set forth.

4. In a rope tramway, the combination, with the traveling buckets K, of the chambered wheel P, the pivoted spout Q, partly inclosing the chambered wheel and arranged to discharge into the bucket, and the arm $w$, adapted to be engaged by the bucket-supports, substantially as specified.

5. The combination, with the chambered wheel P, provided with lugs $q$, of the adjustable catch $r$, arranged to hold the loaded wheel in an unbalanced position, and a lever for operating said catch and adjustably connected therewith, substantially as specified.

6. The combination, with the chambered wheel P, provided with lugs $q$, and the bucket K, carrying the stud $n$, of the catch $r$, adapted to engage the lugs $q$, and the lever $v$, connected with the catch $r$ and arranged to be engaged by the stud $n$, substantially as specified.

7. The combination, with the cables F and the bucket-carrying frames J, provided with studs $f$, of the guides M, substantially as specified.

8. The combination, with the cables F and the pivoted bucket K, of the rollers $j'\ j^2$, supported in the path of the bucket and adapted to invert the bucket, substantially as specified.

9. The combination, with the cables F and the pivoted buckets K, of the rollers $j'\ j^2$ and the adjustable bars $k'$, substantially as specified.

10. The combination, with the longitudinally-grooved bar $j$, the clamp $m$, the follower $m'$, and its bolt, of the end clamps $l\ l$, loosely receiving the ends of said bar $j$, substantially as set forth.

11. The combination, with the bar $j$, having a longitudinal groove in its outer face, tenons $k$ at its ends, and attaching-studs $f$ on its inner side, of the clamp $m$ and the end clamps $l$, having sockets receiving the said tenons, substantially as set forth.

12. The combination, with the rectangular bucket-carrying frame, of rope clips secured to the sides thereof, and comprising central bars having freely-movable clamps on their ends, substantially as set forth.

GEORGE W. PICKETT.
ABEL W. PICKERING.

Witnesses:
J. M. JARDINE,
E. J. BENT.